Sept. 21, 1954

R. M. STANLEY 2,689,697

SAFETY BELT RELEASE

Filed June 18, 1953

ROBERT M. STANLEY
INVENTOR.

BY
Beau, Brooks, Buckley & Beau,
ATTORNEYS

Patented Sept. 21, 1954

2,689,697

UNITED STATES PATENT OFFICE 2,689,697

SAFETY BELT RELEASE

Robert M. Stanley, Buffalo, N. Y., assignor to Stanley Aviation Corporation, Buffalo, N. Y.

Application June 18, 1953, Serial No. 362,595

6 Claims. (Cl. 244—122)

This invention relates to aircraft personnel safety belt devices, and more particularly to novel automatic release arrangements for such safety belts when used in conjunction with aircraft crewmen seats of the emergency ejection types.

It is a primary object of the present invention to provide an improved safety belt release mechanism which operates automatically incidental to operation of the seat ejection mechanism, but in time-delayed relation thereto so that the crewman is held by the safety belt in proper attitude during the seat ejection operation, but immediately thereafter released from the seat assembly for free parachuting to the ground.

Another object of the invention is to provide an improved safety belt release control mechanism as aforesaid, which employs a minimum of relatively simple and fool-proof components, and which avoids undue complication of the crewman accessory equipment, and is sure in operation and relatively inexpensive to fabricate and install.

Other objects and advantages of the invention will appear from the specification hereinafter.

The invention contemplates generally the provision, in combination with any suitable type seat ejection catapult mechanism and any suitable safety belt catch release mechanism, of a control device which is automatically responsive to actuation of the seat catapult mechanism, in time-delayed relation thereto, for causing release of the safety belt latch. Thus, in event of an emergency requiring ejection of the crewman from the aircraft, it is only necessary for the crewman to operate his normal ejection controls, whereupon the seat (with the crewman strapped therein) will be ejected from the aircraft, following which the safety belt will be automatically released without further attention by the crewman so that he will be freed from attachment to the seat and its appurtenances.

Figure 1:
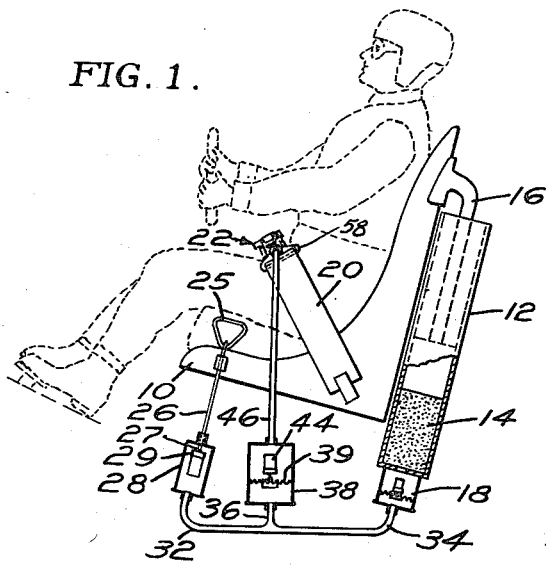
Fig. 1 is a diagrammatic side elevation of an aircraft ejection seat and safety belt arrangement embodying a seat catapult and belt release control mechanism of the present invention.

To further illustrate one possible exemplification of the control arrangement of the invention, the latter is illustrated in the drawings herewith in conjunction with a crewman seat which is designated by the numeral 10 in Fig. 1. The seat catapult mechanism is illustrated to comprise a catapult cylinder 12 carrying a propellant charge as indicated at 14 for actuation of the ejection piston rod 16 connecting to the seat structure. The firing capsule for igniting the catapult charge is indicated at 18; and it is to be understood that the catapult and firing charge arrangement therefor may be of any suitable type and does not comprise per se invention as discussed in this disclosure. The crewman safety belt is illustrated at 20 as comprising two safety belt portions arranged to be latched together at any convenient point, such as in the lap of the crewman or at one side thereof by means of a suitable "buckle" or latch device as indicated at 22 in Fig. 1. Such latch device is of course arranged to be operable manually by the crewman incidental to getting into and out of the aircraft in normal fashion. However, under emergency conditions requiring ejection of the crewman from the aircraft in accord with the present invention, the latch device 22 will incorporate an automatic actuation arrangement; a suitable latch device for these purposes being illustrated in Figs. 3 and 4, and being explained in detail hereinafter.

Figure 2:
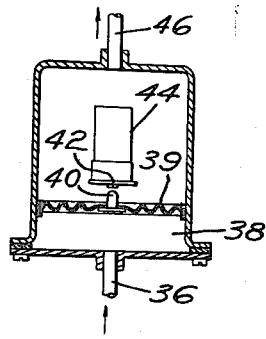
Fig. 2 is an enlarged sectional view of a time delay control component of the mechanism of Fig. 1.

The seat jettison control arrangement may be of any desired type, but as shown in Fig. 1 for example may conveniently include an emergency handle as illustrated at 25 disposed within convenient reach of the crewman and connected to a pull cord 26 for actuation of the firing pin 27 of an "initiator" designated 28. This initiator device includes a powder charge confined within a pressure casing and fired by a detonator cap 29 in response to action thereon by the firing pin. The pressure impulse developed by firing of the powder charge is piped through a conduit 32, one branch of which leads as indicated at 34 to the firing capsule device 18 for operation of the seat catapult. Another branch portion 36 of the conduit 32 leads into another firing capsule device which is illustrated as having a pressure chamber 38. Fig. 2 illustrates in more detail a form of firing capsule device such as is suitable for use as indicated at 18 and 38; the device including a flexible diaphragm 39 carrying a firing pin 40 so arranged that whenever a pressure blast enters the chamber the firing pin is driven to actuate the detonator 42 of a powder charge 44. In the case of the capsule 38 the powder charge is of relatively slow burning characteristics, whereby to provide a gas pressure blast delivered through a conduit 46 leading into connection with the gas pressure inlet nipple 48 (Figs. 3–4) of the safety belt latch automatic control mechanism.

The control components referred to hereinabove are so selected and relatively arranged that whenever the control handle 25 is pulled the initiator blast delivered to the conduit 32 acts simultaneously against the diaphragms in the firing capsules 18—38, but the propellant charge in the capsule 18 is selected so as to act much more rapidly than the propellant charge in the capsule 38 so that the seat catapult power mechanism operates to cause the crewman and seat to be ejected as a unit from the aircraft prior to development of safety belt release actuating pressures by the capsule 38. Thus, the capsule 38 will be selected and arranged to operate in time-delay relation to operation of the seat catapult; it being understood that this time-delay operating relation may be easily provided for simply by proper selection of the propellant charges for the respective capsules.

Figure 3:
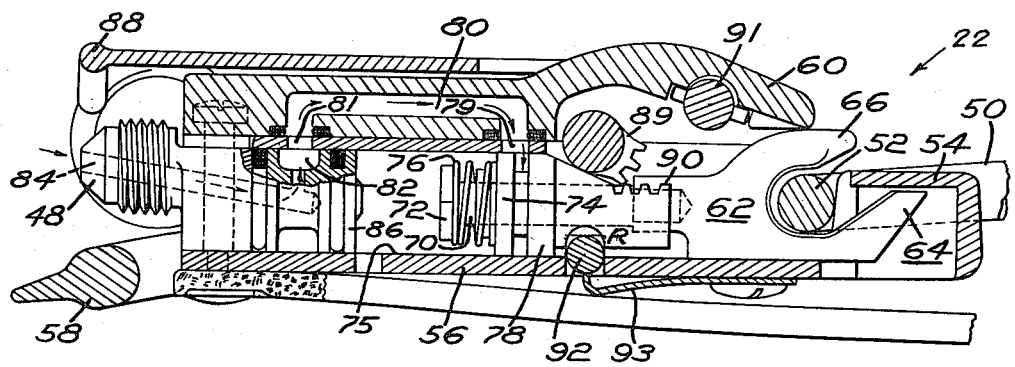
Fig. 3 is a fragmentary longitudinal sectional view, on an enlarged scale, through a standard type safety belt latch device which has been modified for use in conjunction with the present invention, the latch mechanism being illustrated therein in its closed condition.
Figure 4:
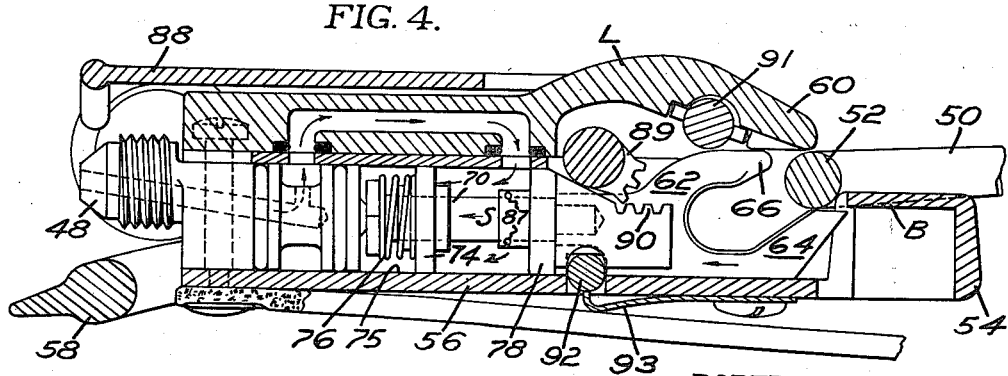
Fig. 4 is a view corresponding to Fig. 3, but showing the latch mechanism in open condition.

A suitable safety belt latch arrangement for use in conjunction with the present invention is illustrated in Figs. 3 and 4. In this case the metal bail permanently connecting to one strand of the web belt per se is illustrated at 50 as being provided with an eye shaped end portion 52 adapted to slip-fit downwardly around a latching post 54 comprising an upwardly extending integral portion of the latch base plate 56. At its opposite end the plate 56 includes a belt attachment eye portion 58 for permanent connection to the other web belt element of the safety belt assembly. Thus, when the bail portion 52 is in hooked position upon the post 54, as shown in Fig. 3, the safety belt is in operative condition for holding the crewman in his seat. To maintain the bail portion 52 against accidental displacement from the post 54, the latch base includes an overhanging head portion 60 as an integral part of its construction, for cooperation with an extensible-retractable cam element 62.

The cam element is shaped to include a lower upwardly inclined cam end portion 64 and an upper forwardly extending hook portion 66 arranged in spaced relation so as to define therebetween a passageway for slip-fitting reception of the bail 52. Furthermore, the forward nose end portion of the overhanging head 60 is disposed in suitably spaced relation to the post member 54 so as to provide therebetween a suitable passageway for slip-fitting reception of the bail member 52. However, whenever the cam member 62 is disposed in its forward or extended position as shown in Fig. 3, the hook portion 66 is thereby extended into the space between the post 54 and the nose portion of the head member 60, so as to block any passage of the bail 52 through the passageway. Thus, it will be appreciated that whenever the bail 52 is in hooked position around the post 54 and the cam member 62 is in its extended position, as shown in Fig. 3, the bail will be thereby locked in holding position. However, when the cam member 62 is retracted as to the position thereof shown in Fig. 4, the hook portion 66 thereof is thereby retracted so as to open the passageway to permit the bail portion 52 to slide off the post 54. Coincident with such retraction movements of the cam member 62, the cam portion 64 thereof will operate to lift the bail member 52 out of hooked engagement upon the post 54.

To control movement of the locking cam element 62, the latter is provided with a rearwardly extending stub shaft 70 which is headed as indicated at 72 and arranged to be controlled by a piston 74. The piston 74 slides within a cylinder-bored portion 75 of the base element 56, and a coil spring 76 is disposed between the head 72 and the piston 74 for purposes to be explained hereinafter. A thimble piston 78 bored to slidably accommodate the stub shaft 70 is also disposed within the cylinder portion 75 ahead of the piston 74, and the piston parts are so shaped as to normally provide a passageway therebetween in open communication with a pressure inlet port 79 through the cylinder wall. The port 79 in turn communicates with a passageway 80 formed within the base plate structure and which in turn communicates through a cylinder wall port 81 with a drilled passageway system 82—84 extending through the end plug 86 of the cylinder compartment and through the pressure supply conduit connection nipple 48.

Thus, it will be appreciated that upon conveyance of pressure from the capsule 38 through the conduit 46 and into the nipple 48, the pressure will be immediately transmitted through the inner port and conduit system 79, 80, 81, 82, 84, into the space behind the piston 74, thus tending to drive the latter to move toward the left as viewed in Fig. 3 against the force of the spring 76. This movement of the piston 74 first causes the piston 74 to uncover a series of lock balls 87 which normally reside in registering recesses drilled in the piston 78 and the stub shaft 70 respectively for holding them in assembled relation. When the balls are uncovered they fall out of place and thus release the stub shaft from the piston 78 so that the cam element 62 will thereupon be withdrawn to the retracted position thereof shown in Fig. 4. Thus, the bail 52 is released and cammed upwardly out of engagement with the locking post 54.

Provision for normal manual control of the latching mechanism is by means of handle 88 arranged to pivot about the axis of a segment gear 89 which is thereby rotatable in clockwise direction, as viewed in Figs. 3 and 4, to engage with a rack portion 90 formed integral with the piston member 78. Thus, upon lifting the left hand end portion of the handle 88, the latter is caused to pivot upwardly and over so as to rotate the gear 89 to drive the rack 90 toward the left as viewed in the drawing, thereby forcing the piston 78 to move toward the left in pressure bearing relation against the piston 74. This causes the piston 74 to be displaced toward the left and to pressure the cam element 62 to move toward the left to unlocking position, as shown in Fig. 4. Reverse movement of the handle 88 will cause the rack to be driven to the right so as to return the cam element 62 to the extended or locking position as illustrated in Fig. 3. To prevent unintended operation of the belt release handle 88, a locking pin 91 is provided and arranged so that it must necessarily be withdrawn before the handle 88 may be lifted; and to prevent unintended movements of the latch control rack member a click stop device is preferably employed as indicated at 92; a leaf spring 93 being provided to normally maintain the click stop 92 in holding position.

Whereas, the invention has been illustrated and described in detail in conjunction with the specific belt latch device of Figs. 3 and 4, it is to be understood that the invention is not limited thereto but that any other suitable form of latch device may be readily arranged to be used in accord with the present invention. For example, in lieu of the gas pressure actuated control system disclosed and described, any other suitable gas or hydraulic or mechanical or electrical control system or the like could be employed and arranged to achieve the time-delayed operation of the safety belt release mechanism; functioning automatically incidental to jettisoning of the seat as explained hereinabove.

I claim:

1. In combination, an aircraft ejection seat arranged to be jettisoned from an aircraft, seat catapult power supply means coupled to said seat for ejecting the latter from an aircraft, mechanically triggered control means for said catapult power supply means, a crewman safety belt carried by said seat and comprising components arranged to be interconnected for holding a crewman in said seat by means of a releasable latch device, said latch device including a release mechanism, a gas pressure responsive control for said release device, and a manual control operable to simultaneously initiate actuation of said catapult trigger control and said belt release control mechanisms, the control for said belt release including means whereby it is operable in time-delayed relation to said catapult control to forestall release of said seat belt latch until some predetermined time subsequent to actuation of said seat catapult.

2. In combination, an aircraft ejection seat arranged to be jettisoned from an aircraft, catapult means coupled to said seat for ejecting the latter from an aircraft, control means for actuating said catapult means, a crewman safety belt device carried by said seat and including a releasable latch device, said latch device including a gas pressure responsive control mechanism, and a manual control device operable to actuate a pyrotechnic gas pressure generator to simultaneously initiate actuation of said control mechanisms, the control mechanism of said belt latch release device having means whereby it is slow in operative relation to the catapult control means to withhold release of said seat belt latch until subsequent to actuation of said seat catapult.

3. In combination, an aircraft ejection seat arranged to be jettisoned from an aircraft, seat catapult gas pressure power supply means coupled to said seat for ejecting the latter from an aircraft, gas pressure-responsive control device for actuating said catapult power supply means, a crewman safety belt device carried by said seat and comprising components arranged to be interconnected for holding a crewman in said seat by means of a releasable latch device, said latch device including a release control device, a pressure-responsive control mechanism in connection with said release control device, and a manually controllable initiator device operable to generate gas pressure forces applied simultaneously to initiate actuation of said control devices, the control device of said belt latch release including time-delay means operable to withhold release of said seat belt latch until subsequent to ejection of said seat from said aircraft.

4. In combination, an aircraft ejection seat arranged to be jettisoned from an aircraft, seat ejection power means coupled to said seat, gas pressure responsive control means for said ejection power means, a releasable safety belt device carried by said seat and comprising components arranged to be interconnected for holding a crewman in said seat, gas pressure responsive control mechanism in connection with said belt release device, and an initiator operable to deliver gas under pressure to said control devices, the control mechanism of said belt release device including time-delay means operable to forestall release of said seat belt until some predetermined time subsequent to actuation of said seat ejection means.

5. In combination, an aircraft ejection seat arranged to be jettisoned from an aircraft, seat catapult power supply means coupled to said seat for ejecting the latter from an aircraft, gas pressure responsive control means for said catapult power supply means, a crewman safety belt carried by said seat and comprising components arranged to be interconnected for holding a crewman in said seat by means of a releasable latch device, said latch device including a release mechanism, a mechanically triggered control for said release device, and a manual control operable to simultaneously initiate actuation of said catapult and belt release control mechanisms.

6. In combination, an aircraft ejection seat arranged to be jettisoned from an aircraft, seat catapult power supply means coupled to said seat for ejecting the latter from an aircraft, gas pressure responsive control means for said catapult power supply means, a crewman safety belt carried by said seat and comprising components arranged to be interconnected for holding a crewman in said seat by means of a releasable latch device, said latch device including a release mechanism, a mechanically triggered control for said release device, and a manual control operable to simultaneously initiate actuation of said catapult and belt release control mechanisms, the control for said belt release including means operable in time-delayed relation to said catapult control to forestall release of said seat belt latch until some predetermined time subsequent to actuation of said seat catapult.

References Cited in the file of this patent

UNITED STATES PATENTS

| Number | Name | Date |
| --- | --- | --- |
| 2,494,207 | Sabbia | Jan. 10, 1950 |
| 2,504,148 | Ogden | Apr. 18, 1950 |
| 2,569,638 | Martin | Oct. 2, 1951 |

FOREIGN PATENTS

| Number | Country | Date |
| --- | --- | --- |
| 486,138 | Canada | Sept. 2, 1952 |
| 585,274 | Great Britain | Feb. 4, 1947 |